United States Patent
Kumar et al.

(10) Patent No.: US 8,269,817 B2
(45) Date of Patent: Sep. 18, 2012

(54) FLOOR CONTROL IN MULTI-POINT CONFERENCE SYSTEMS

(75) Inventors: Sanjeev Kumar, Sunnyvale, CA (US); Shmuel Shaffer, Palo Alto, CA (US); Labhesh Patel, San Francisco, CA (US); Mukul Jain, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 1009 days.

(21) Appl. No.: 12/174,145

(22) Filed: Jul. 16, 2008

(65) Prior Publication Data

US 2010/0013905 A1    Jan. 21, 2010

(51) Int. Cl.
*H04N 7/14* (2006.01)
(52) U.S. Cl. ............... 348/14.11; 348/14.08; 348/14.09; 348/14.1; 348/14.07
(58) Field of Classification Search ........... 348/E7.083–E7.084, 14.07–14.11
See application file for complete search history.

(56) References Cited

U.S. PATENT DOCUMENTS

| | | | |
|---|---|---|---|
| 4,531,024 A | 7/1985 | Colton et al. | |
| 5,745,380 A * | 4/1998 | Sandvoss et al. | 379/90.01 |
| 6,369,846 B1 * | 4/2002 | Katsumi | 348/14.01 |
| 6,583,806 B2 * | 6/2003 | Ludwig et al. | 348/14.08 |
| 7,561,179 B2 * | 7/2009 | Johansen et al. | 348/14.09 |
| 7,692,681 B2 | 4/2010 | Rengaru | |
| 7,738,893 B2 * | 6/2010 | Lim | 455/518 |
| 2003/0152040 A1 | 8/2003 | Crockett et al. | |
| 2005/0264648 A1 * | 12/2005 | Ivashin et al. | 348/14.09 |
| 2006/0055771 A1 * | 3/2006 | Kies | 348/14.03 |
| 2007/0291108 A1 * | 12/2007 | Huber et al. | 348/14.02 |
| 2009/0112983 A1 * | 4/2009 | Bekiares et al. | 709/204 |

FOREIGN PATENT DOCUMENTS

| | | |
|---|---|---|
| EP | 1690428 A2 | 8/2006 |
| WO | WO 99/63773 | 12/1999 |
| WO | WO 01/67674 | 9/2001 |
| WO | WO 02/093812 | 11/2002 |

(Continued)

OTHER PUBLICATIONS

PCT Mar. 16, 2005 International Search Report from PCT/IB2004/004012; 4 pages.

(Continued)

*Primary Examiner* — Curtis Kuntz
*Assistant Examiner* — Ryan Robinson
(74) *Attorney, Agent, or Firm* — Patent Capital Group

(57) ABSTRACT

In one embodiment, a conference with multiple end points is provided. At the locations, multiple screens may be configured to display video from a portion of the multiple end points. Video from multiple locations is output onto the multiple screens, such as video streams from N different segments are output on N different screens. The video output may be determined based on a first dimension of the floor control algorithm. A push-to-talk input may then be received from a button. A video segment associated with the push-to-talk button is then determined and the video segment is output on one of the multiple screens in response to receiving the push-to-talk input. The push-to-talk input may be used by users that cannot actively participate in the first dimension of the floor control algorithm. For example, users using sign language cannot speak louder and thus by using the push to talk button or hand gestures can indicate their desire to be switched in as one of the displayed segments.

20 Claims, 5 Drawing Sheets

FOREIGN PATENT DOCUMENTS

| WO | WO2005/062569 | 7/2005 |
|---|---|---|
| WO | WO2006/044097 | 4/2006 |
| WO | WO 2006/044097 | 4/2006 |
| WO | WO2006/062700 | 6/2006 |

OTHER PUBLICATIONS

PCT Feb. 28, 2006 International Search Report from PCT/US2005/033663; 2 pages.

PCT Apr. 17, 2007 International Preliminary Report on Patentability and Written Opinion of the International Searching Authority from PCT/US2005/033663; 6 pages.

"Comverse demonstrates Push to Show Video Walkie-Talkie service using IP multimedia subsystem (IMS) capabilities as part of its total communication portfolio," ITU Telecom World 2003, Oct. 7, 2003, XP002282079.

"LG Electronics Unveils New Push-to-View Technology," Mobiledia.com; Feb. 14, 2005; 2 pages http://www.mobiledia.com/news/25797.html, 3 pages.

"Motorola Technology, Seamless Mobility—Real-Time Communication," Motorola, Inc., [retrieved and printed Apr. 2, 2006] http://www.motorola.com/content.jsp?globalObjectId=6689-9312; 1 page.

"Samsung Demonstrates 3G Push-to-All Technology," 3G Forum: Jan. 4, 2005; 1 page http://www.3g.co.uk/3GForum/archive/index.php/t-19071.html.

"Samsung Demonstrates Push-to-All Technology," Samsung Electronics Co., Ltd., Corporate News, Feb. 24, 2005; 2 pages http://www.samsung.com/us/news/newsRead.do?news_group=corporatenews&news_seq=2564.

* cited by examiner

FLOOR CONTROL IN MULTI-POINT CONFERENCE SYSTEMS

BACKGROUND

Particular embodiments generally relate to video conferencing.

Video conferences include multiple locations where a subset of the locations can be displayed at once during the conference. A conference system may use loudness when deciding which locations to display on a number of display screens. For example, the top N (e.g., three) loudest locations may be displayed on three screens. This algorithm generally works well as users expect to see whichever locations that have the most people talking the loudest. However, the algorithm does not work when people who communicate using non-audible methods, such as by sign language or by other gestures. These people cannot effectively cause their location to be displayed on the conference. Also, using the top N loudest location algorithm may cause users to try to speak louder than others causing people to raise their voice continually during the conference.

DETAILED DESCRIPTION OF EMBODIMENTS

Overview

In one embodiment, a conference with multiple end points is provided. For example, the multiple end points may be at multiple locations participating in a video conference. A segment may be used to refer to a video stream that includes video from a given location. At the locations, multiple screens may be configured to display video from a portion of the multiple end points Video from multiple locations is output onto the multiple screens, such as video from three different segments is output on three different screens while the media streams from the other endpoints are not rendered to any video display as the users may have only a limited (e.g., 3) video display screens. The selection of which video stream should be rendered to the video display screens may be determined based on a floor control algorithm. For example, the floor control algorithm may be based on a first dimension of displaying N segments that are determined to be the loudest. A push-to-talk input may then be received from a button. A video segment associated with the push-to-talk button is then determined and the video stream is output on one of the multiple screens in response to receiving the push-to-talk input. The push-to-talk input may be invoked by users who cannot actively participate in the loudness dimension of the floor control algorithm. For example, users using sign language cannot speak louder and thus by using the push to talk button can indicate their desire to be switched in as one of the displayed segments.

Example Embodiments

Figure 1:
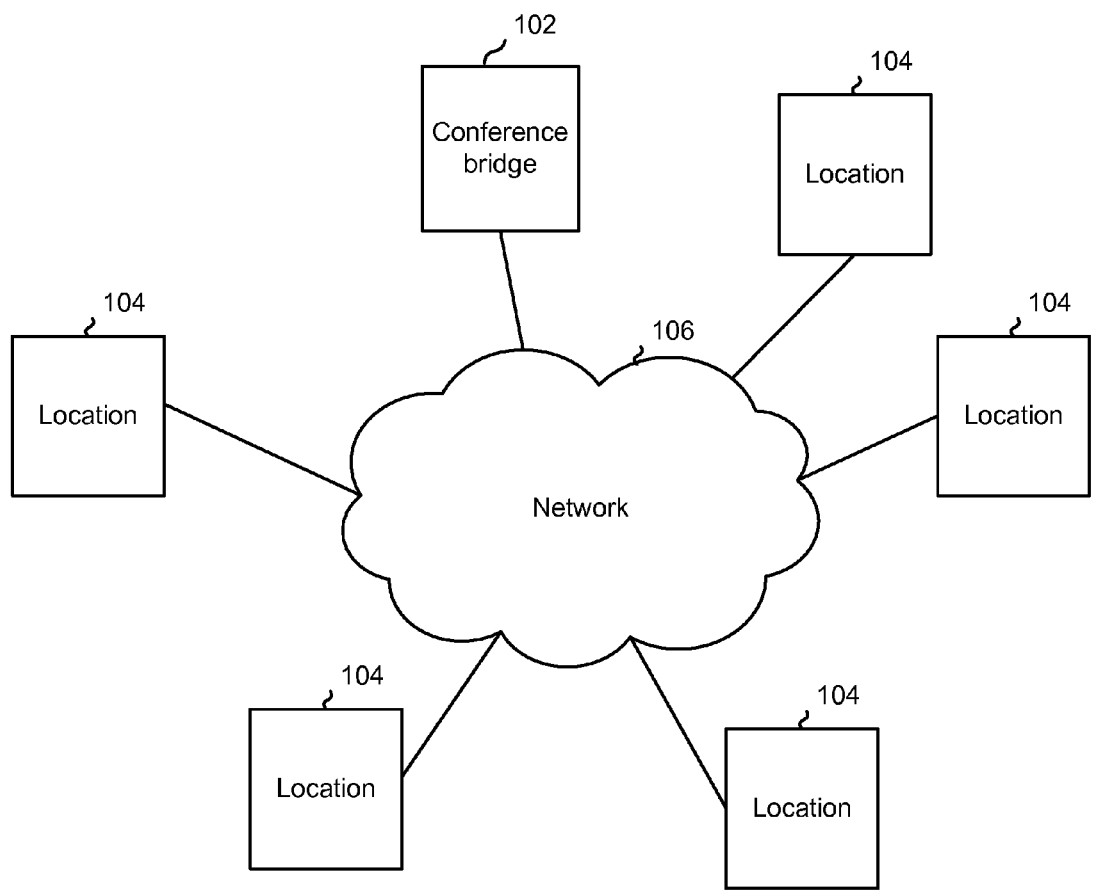
FIG. 1 depicts an example of a communications system for providing a conference between users at various locations.

FIG. 1 depicts an example of a communications system for providing a conference between users at various locations. A conference may be supported at locations 104. A location may be conference room or other area. Locations 104 may be remote from each other as in different conference rooms in different areas of a building, different buildings, etc.

A conference bridge 102 communication such as text, audio and/or video between locations 104 that are participating in a multimedia conference. A conference may include any communication session between a plurality of users transmitted using any text, audio and/or video methods.

Network 106 includes any communication equipment that can facilitate transfer of multimedia signals to provide the conference. Network 106 includes any wireless or wired networks.

Conference bridge 102 serves as an intermediary during a multi-point conference. Conference bridge 102 acts as a conduit that interconnects media signals between end points of locations 104. For example, conference bridge 102 may collect audio and/or video signals generated at a location 104 and distribute the signals to other locations 104. In another example embodiment, media signals may flow directly between the video cameras and the video display units.

Conference bridge 102 may facilitate switching of video segments that are displayed for the conference. A video segment may be a video stream that is captured by a camera. For example, a location 104 may have N (e.g., three) cameras that record video from N (e.g., three) different angles of the room. The video for each angle may be a segment. At any time, video from one of the angles may be displayed in the conference. Also, video of the entire room may be recorded for each location. The switching in this case would be among locations (e.g., three locations out of five may be shown on three screens at once).

A floor-control algorithm may be used to determine which segments are displayed in the conference. A segment has floor control when it is displayed on one of the display screens. In one example, the floor control algorithm, in a first dimension, determines which video segments are the loudest, such as one or more users from a given segment that are speaking the loudest. In one embodiment, the three loudest speakers from e.g., three different segments are determined and sent on the switched video streams that are sent to locations 104. The three loudest speakers may then be displayed. For example, one location would see the three loudest locations (other than that location) on three display screens.

Particular embodiments also provide a push-to-talk button that allows a user to indicate a desire to be shown in a conference. For example, when a user presses a push-to-talk (PTT) button, conference bridge 102 may determine that this user should be shown in the conference. In one example, if three video screens are being used for a conference, one of the video screens may then show the user who pressed the push-to-talk switch. The push-to-talk button allows a user who wants to gain floor control to bypass the loudness-based floor control switching algorithm. For example, a user may be using sign language and thus cannot speak. In this case, the push-to-talk button may be used to indicate an interest in speaking. Conference bridge 102 then uses the input to determine if the user should be displayed. For example, the two loudest speakers and the user who pressed the push-to-talk button may be displayed in the conference.

Figure 2:
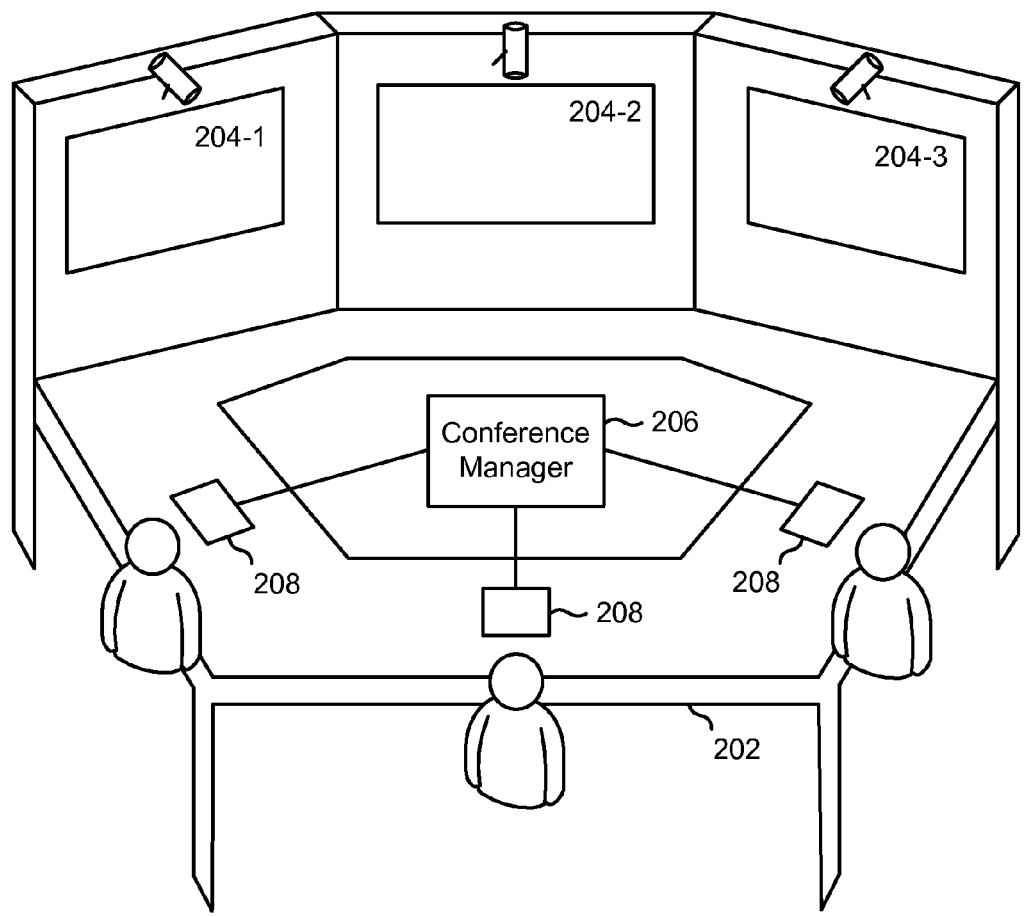
FIG. 2 depicts an example of a location according to one embodiment.

FIG. 2 depicts an example of a location 104 according to one embodiment. Although location 104 is shown, it will be understood that other configurations may be provided. For example, the arrangement and number of displays and users may be different.

Users may be participating in a conference and may be situated around conference table 202. During the conference, the users may engage in the session as speakers or participate as non-speakers. Also, users may use non-audible methods to communicate, such as using sign language, gestures, facial expressions, etc. The non-audible method of communication may be referred to as gesture communication. Gesture communication may be any communication that is performed by a user and does not involve speaking.

Display screens 204 include any devices that can display an image of one or more conference users at location 104. Examples of display screens 204 include a flat screen TVs, notebook PCs, monitors, etc. In one embodiment, display screens 204 may display three different segments. For example, video streams from three different locations 104 may be displayed. The three video streams display different users from different locations 104. Although three display screens are described, it will be understood that any number of screens may be used. The screens may be virtual, such as a display device may have three windows displaying three locations.

In one embodiment, location 104 may include a number of cameras that capture video of the users. For example, three cameras may capture video of three different areas. Although three cameras are described, it will be understood that any number of cameras may be provided. The three cameras generate three video streams that may be sent to a conference end point—conference manager 206. Conference manager 206 may then send the video streams to conference bridge 102. In addition to the video streams, audio may be captured for the users. For example, audio for the entire location 104 may be provided. In accordance with an example embodiment, individual audio streams may be captured by placing microphones in the vicinity of each conference participants. In accordance with this embodiment, each one of the media streams is associated with a video stream from the corresponding conference participant. Each location may have three video streams captured (i.e., segments) as well as three associated audio streams. Any of these segments may be displayed on display screens 204 in remote locations 104.

A push-to-talk button 208 provides a method for a user to provide input to conference manager 206 indicating a desire to be displayed in the conference. For example, push-to-talk button 208 is any other input device that is situated on conference table 202. Also, push-to-talk button 208 may be other input devices, such as a button on a cellular phone, a button on a remote control, or an input on a conference telephone. Push-to-talk button 208 generates a request for floor control by a user. Conference manager 206 may receive the request and forward it to conference bridge 102 along with the video and/or audio for the conference.

Conference bridge 102 then uses the request for floor control received from the push-to-talk button in determining which segments should be granted floor control. For example, the request using the push-to-talk button 208 is considered when determining floor control. In a first dimension, a loudness-based algorithm is used to determine the top three segments that are displayed on displays 204 until a push-to-talk request is received. The floor control algorithm then can determine if floor control should be granted to a segment that asserted the push-to-talk request in a second dimension of the floor control algorithm. Variations of this algorithm will be described in more detail below.

Figure 3:
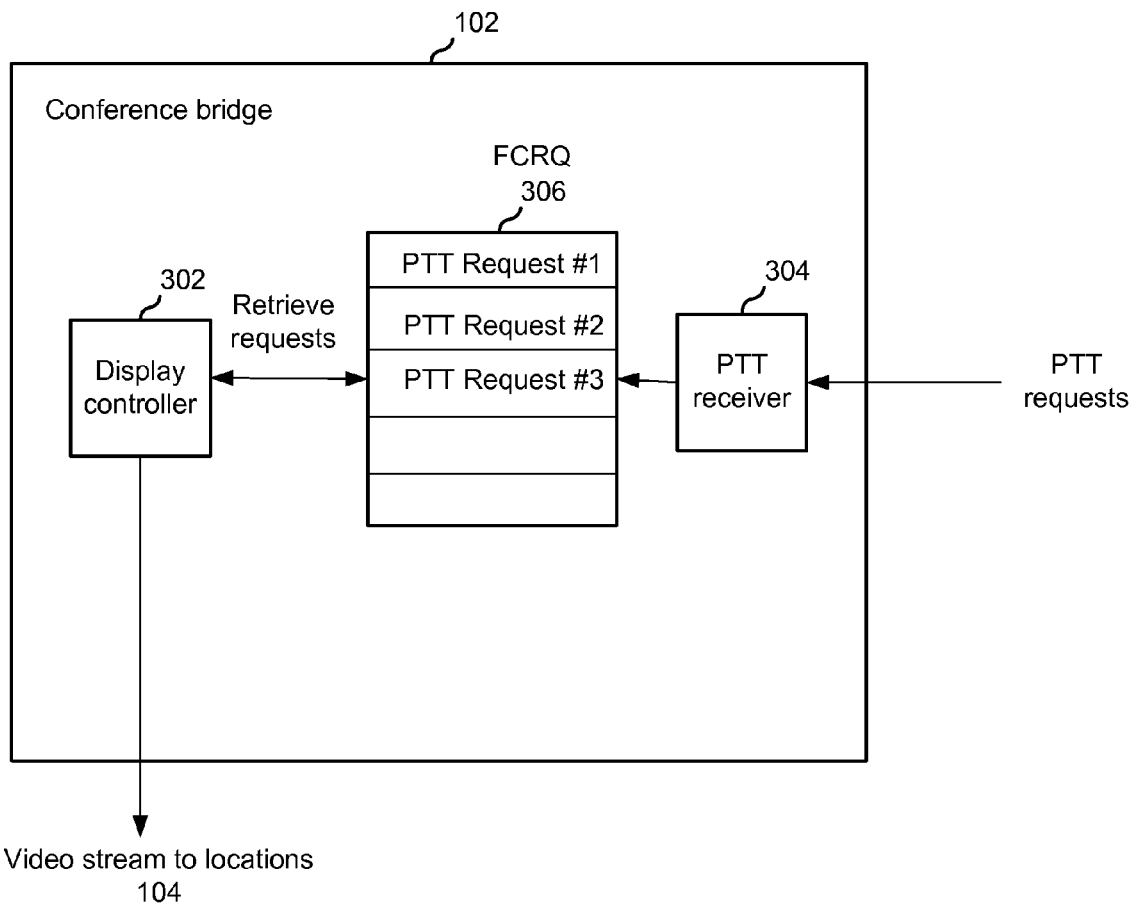
FIG. 3 depicts a more detailed example of a conference bridge according to one embodiment.

FIG. 3 depicts a more detailed example of conference bridge 102 according to one embodiment. A display controller 302 is configured to determine which video segments should be displayed on display screens 204. A floor-control algorithm may be used to determine the video segments. In one dimension, the floor-control algorithm incorporates a loudness-based algorithm. For example, the three loudest speakers may be displayed on display screens 204. In addition, the floor-control algorithm uses push-to-talk requests to determine if a video segment that asserts the push-to-talk request should be granted floor control.

A PTT receiver 304 receives push-to-talk requests from push-to-talk buttons 208. A floor-control request queue (FCRQ) 306 may be used to store the requests. When a user at any location 104 presses push-to-talk button 208, the request is placed in FCRQ 306. The request may be stored with information (a location identifier) that identifies a video segment associated with the request. Also, information may be stored identifying the push-to-talk button 208 which was used to generate the request.

Display controller 302 is then configured to determine when to grant floor control to a request in FCRQ 306. In one example, if there are pending requests in FCRQ 306, display controller 302 retrieves one of the requests (e.g., the oldest request received in FCRQ 306 or a request considered to have the highest priority) and switches in the segment associated with the request. For example, video of a location 104 or a user that sent the request is switched in with two other segments. The video of the three segments may then be sent to locations 104.

In one embodiment, a dedicated screen is provided for push-to-talk requests. For example, if a push-to-talk request is switched in, it may always appear on display screen 204-1. This may provide continuity in that users expect to see people who may be performing sign language or any other gestures on display screen 204-1. It will be understood that in other embodiments, segments that are associated with push-to-talk requests may be displayed on other display screens 204.

In one embodiment, when a user has floor control and is done communicating, the user can press push-to-talk button 208 again to relinquish floor control. Display controller 302 may then retrieve the next request from FCRQ 306, switch the associated segment into the video stream, and so on, until FCRQ 306 is empty. Once FCRQ 306 is empty, the dedicated video display screen 204-1 may be relinquished until a new request for floor control is added to FCRQ 306.

In the above algorithm, requests are always processed from FCRQ 306 when they are present; however, different algorithms may be used to determine floor control for video segments. In one example, a measure of loudness may be determined for video segments. The power of the audio as measured in dBm may be determined for users that are speaking in segments. It will also be appreciated that though the loudness of the audio is described as measured by dBm, other loudness measurements are also within the spirit and scope. Also, a number of the push-to-talk inputs for users whose push-to-talk request is in the FCRQ 306 may be counted and mapped to a loudness level. For example, if a user selects push-to-talk button 208 a number of times, it may correlate to a level of loudness. If the user continually pushes push-to-talk button 208, it may correspond to a user that is speaking more loudly. Accordingly, this maps a virtual loudness vs. real loudness associated with video from various segments. Display controller 302 can then determine the three loudest segments. For example, if a segment has either a virtual loudness or real loudness in the top three, it may be rendered to one of display screens 204.

In addition to selecting push-to-talk input 208, other gesture information may be used to determine the virtual loudness. For example, the strength of gestures may be used to determine the virtual loudness. An analysis of video may be determined to determine a gesture level. For example, if a user is gesturing with her hands and exhibits more motion in the video, a higher gesture level may be determined. Also, facial expressions may be analyzed to determine the gesture level.

Also, a threshold for a loudness level and for a critical queue size (CQS) may be configured. If the queue size of FCRQ 306 is larger than the critical queue size, then display controller 302 may use multiple display screens 204 to service requests from FCRQ 306. For example, display controller 302 may switch out segments for which the loudness level is below the preconfigured loudness threshold in favor of segments that have inputted a push-to-talk request. When the queue size of FCRQ 306 falls below the critical queue size, then display controller 302 may return to only using the dedicated display screen 204 for servicing requests from FCRQ 306. Also, the above mapping of virtual loudness to real loudness may be used to determine if multiple screens should be used. For example, if the virtual loudness of requests in FCRQ 306 is louder than the real loudness of video segments, then requests may be serviced from FCRQ 306 for multiple display screens 204 instead of displaying other segments that have real loudness. This ensures that the three speakers that have either the highest virtual loudness or real loudness are displayed.

In another embodiment, display controller 302 automatically determines when to take the floor control back from a location 104 to service another request from FCRQ 306. If a loudness level (virtual or real) in a segment that has floor control goes below a preconfigured threshold for a preconfigured amount of time, then this causes display controller 302 to take floor control back and grant it to another video stream. Also, the gesture energy of users may be calculated from video of a segment that is currently displayed. If both the loudness level and gesture energy go below a certain threshold for a preconfigured amount of time, then the floor control is relinquished by the segment and may be granted to another video stream.

Figure 4:
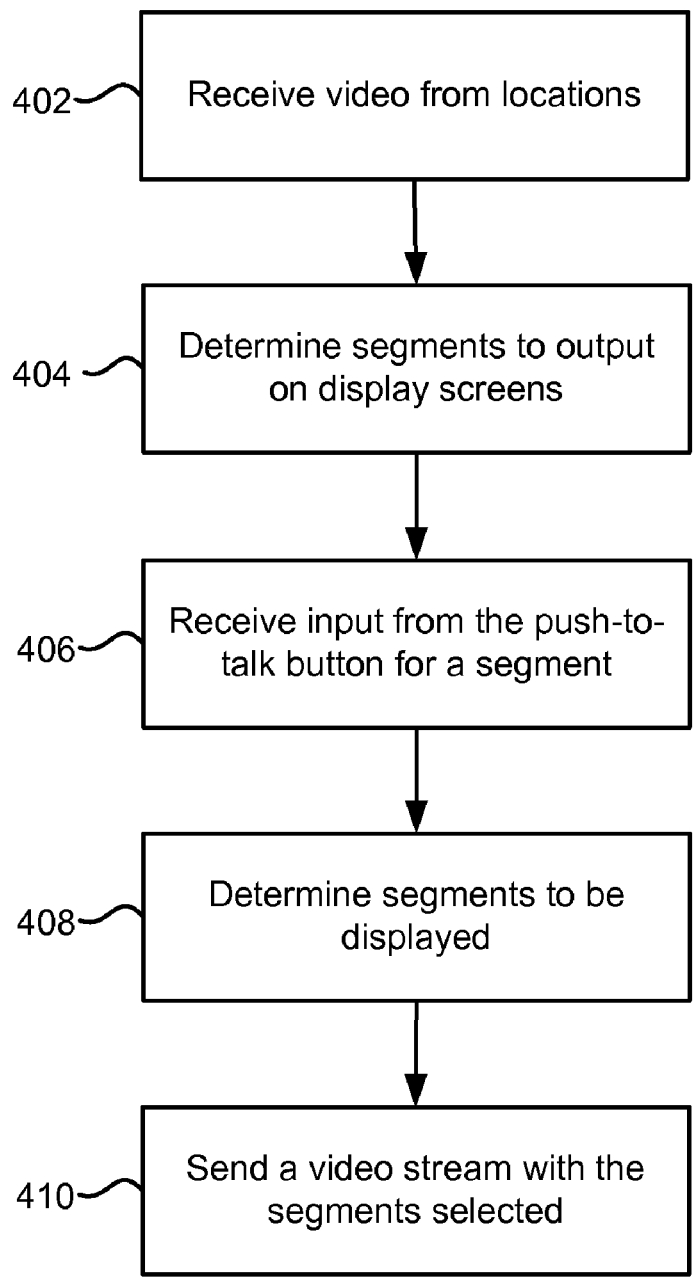
FIG. 4 depicts a simplified flowchart of a method for determining floor control according to one embodiment.

FIG. 4 depicts a simplified flowchart of a method for determining floor control according to one embodiment. Step 402 receives video from locations 104. For example, five video streams may be received from five different cameras situated in each location 104.

Step 404 determines segments to output on display screens 204. For example, a floor control algorithm that is based on two dimensions may be used. The first dimension may be loudness based and the top N. e.g., three, loudest segments may be used. The second dimension may be whether a push-to-talk request has been received.

Step 406 receives input from push-to-talk button 208 for a segment. For example, a user may press push-to-talk button 208 at a location 104.

Step 408 determines segments to be displayed. For example, one of the three loudest segments may be switched out in favor of the segment in which the input for push-to-talk button 208 was received. Also, any of the variations discussed above may be used.

Step 410 sends video streams with the selected segments. For example, video associated with the two loudest segments in addition to video associated with the segment for which a push-to-talk button 208 input was received may be sent. In this case, the video may be tagged such that the segment in which the push-to-talk input was received is displayed on a dedicated display screen 204-1 and the other two segments are displayed on display screens 204-2 and 204-3, respectively.

Figure 5:
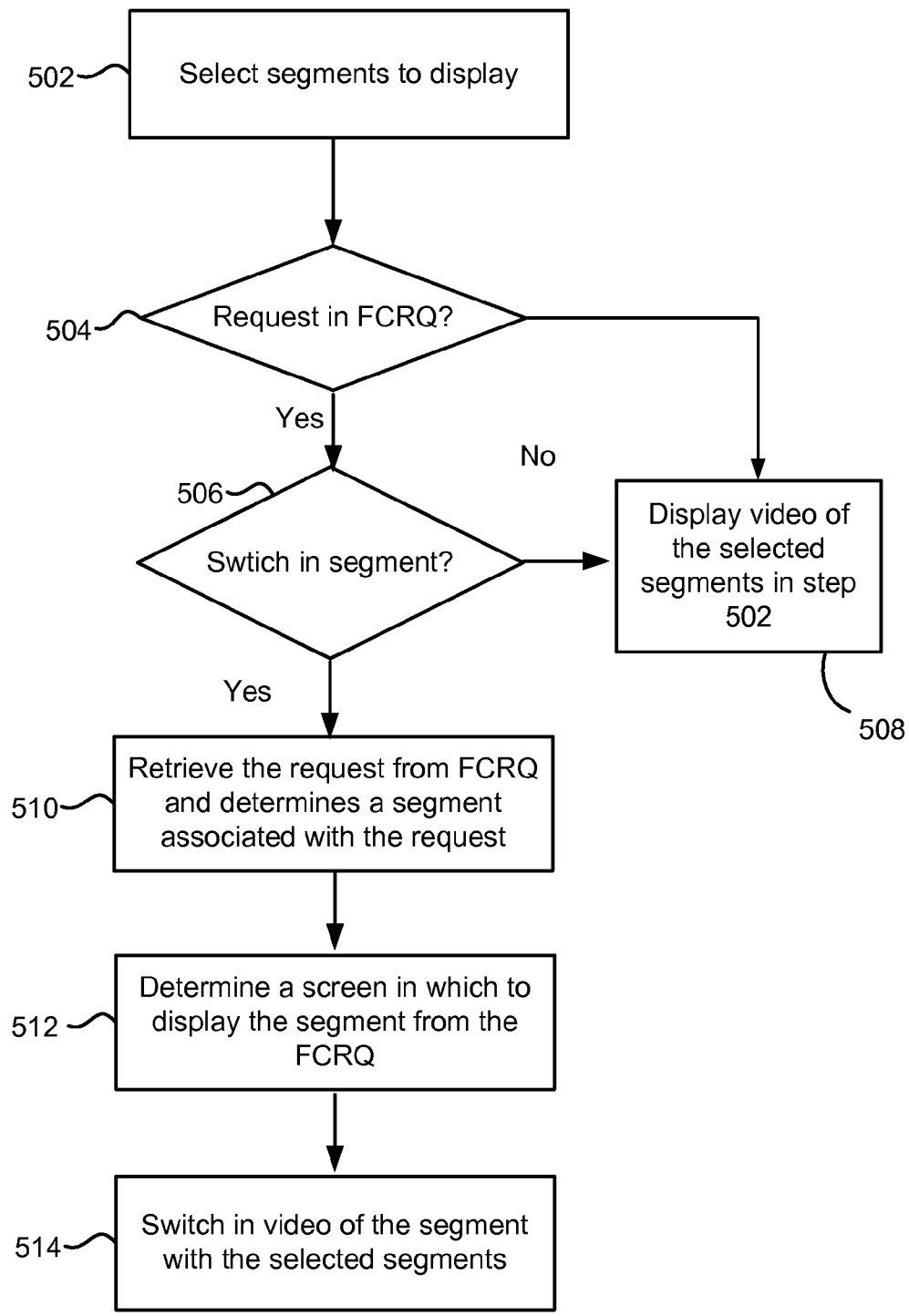
FIG. 5 depicts a simplified flowchart of a method for determining switching for a video conference at the conference bridge according to one embodiment.

FIG. 5 depicts a simplified flowchart of a method for determining switching for a video conference at conference bridge 102 according to one embodiment. Step 502 selects segments to display. For example, segments considered the three loudest may be determined.

Step 504 determines if a request is present in FCRQ 306. If there is not a request, then step 508 causes display of the selected segments in step 502. If there is a request, step 506 then determines if the segment associated with the request should be switched into the video conference. For example, the variations described above may be used. In one example, a virtual loudness may be determined and is used to determine if the segment should be switched in with other segments that are ranked by real loudness.

If a segment should not be switched in, step 508 causes display of the selected segments in step 502. If a segment should be switched in, step 510 retrieves the request from FCRQ 306 and determines a segment associated with the request. The request may include which location 104 requested floor control using push-to-talk button 208. Also, the multimedia stream associated with the user who requested floor control may be included in the video streams outputted from the display controller 302.

Step 512 determines a screen in which to display the segment. For example, a dedicated video screen 204 may be used.

Step 514 switches in video of the segment with the selected segments. For example, one of the selected segments may be replaced with video for the segment associated with the FCRQ.

Accordingly, particular embodiments service requests for floor control in a conference system such that users at locations can be granted floor control without being the loudest and will be seen at all other locations 104. This enables users who cannot speak (and hence cannot raise their voice) to communicate using gestures or sign language once they gain floor control.

Particular embodiments provide many advantages. For example, it enables participants to receive floor control without having to raise his/her voice. It also enables users who cannot speak but can communicate using gestures to gain floor control when they wish to communicate.

Also, algorithms are provided to interwork a top three speaker algorithm with the push-to-talk floor control requests resulting in a system that balances loudness vs. floor control requests. Other algorithms are also provided to handle the requests for floor control using push-to-talk button 208.

A dedicated video screen may be used for the push-to-talk requests. This provides continuity for users viewing the conference. Also, this screen may not be preempted by someone speaking very loudly at another location 104. Further, other display screens may be used to service push-to-talk requests depending on queue size and loudness level in other segments. However, floor control may be taken back from push-to-talk users based on other algorithms.

Although the description has been described with respect to particular embodiments thereof, these particular embodiments are merely illustrative, and not restrictive. Although conference systems are described, any system granting floor control to users may be used by particular embodiments.

Any suitable programming language can be used to implement the routines of particular embodiments including C, C++, Java, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time.

Particular embodiments may be implemented in a computer-readable storage medium for use by or in connection with the instruction execution system, apparatus, system, or device. Particular embodiments can be implemented in the form of control logic in software or hardware or a combination of both. The control logic, when executed by one or more processors, may be operable to perform that which is described in particular embodiments.

Particular embodiments may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of particular embodiments can be achieved by any means as is known in the art. Distributed, networked systems, components, and/or circuits can be used. Communication, and transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

Thus, while particular embodiments have been described herein, latitudes of modification, various changes, and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit.

We claim:

1. A method comprising:
   providing a conference with multiple locations;
   receiving a plurality of video segments from the multiple locations, wherein a particular location can send more than one video segment, and wherein the particular location includes a plurality of displays showing video from a portion of the multiple locations;
   receiving a push to talk (PTT) input from a PTT button;
   determining a PTT video segment associated with the push to talk input;
   switching the PTT video segment in with one or more video segments; and
   displaying the PTT video segment with the one or more video segments on a selected one of the plurality of displays.

2. The method of claim 1, further comprising causing rendering of the PTT video segment on a first display screen.

3. The method of claim 2, wherein the first display screen is a dedicated screen for displaying PTT video segments in which the push to talk input has been received.

4. The method of claim 1, further comprising:
   determining the plurality of video segments using a first dimension of a floor control algorithm; and
   replacing a video segment in the plurality of video segments with the PTT video segment when the push to talk input is received.

5. The method of claim 4, wherein the first dimension of the floor control algorithm comprises an N loudest speaker algorithm, wherein the plurality of video segments are determined as the N loudest video segments.

6. The method of claim 4, wherein the floor control algorithm incorporates receiving input from the PTT button, wherein the PTT video segment and the one or more video segments are determined partially based on receiving input from a pressing of the PTT button.

7. The method of claim 1, further comprising:
   receiving multiple push to talk requests;
   determining a virtual loudness based on the multiple push to talk requests;
   mapping the virtual loudness to a real loudness for the plurality of video segments from the multiple locations;
   switching in the PTT video segment based on the virtual loudness and the real loudness.

8. The method of claim 7, wherein the PTT video segment is switched in by replacing a removed video segment if the PTT video segment has a higher virtual loudness than the removed video segment.

9. The method of claim 7, wherein the virtual loudness is determined based on detected gestures in the plurality of video segments.

10. The method of claim 1, further comprising:
    storing the push to talk request in a queue, and
    retrieving the push to talk request from the queue for switching in.

11. An apparatus comprising:
    one or more processors; and
    logic encoded in one or more tangible media for execution by the one or more processors and when executed operable to:
    provide a conference with multiple locations;
    receive a plurality of video segments from the multiple locations, wherein a particular location can send more than one video segment, and wherein the particular location includes a plurality of displays showing video from a portion of the multiple locations;
    receive a push to talk (PTT) input from a PTT button;
    determine a PTT video segment associated with the push to talk input; and
    switch the PTT video segment in with one or more video segments; and
    display the PTT video segment with the one or more video segments on a selected one of the plurality of displays.

12. The apparatus of claim 11, wherein the logic when executed is further operable to cause rendering of the PTT video segment on a first display screen.

13. The apparatus of claim 12, wherein the first display screen is a dedicated screen for displaying PTT video segments in which the push to talk input has been received.

14. The apparatus of claim 11, wherein the logic when executed is further operable to:
    determine the plurality of video segments using a first dimension of a floor control algorithm; and replace a video segment in the plurality of video segments with the PTT video segment when the push to talk input is received.

15. The apparatus of claim 14, wherein the first dimension of the floor control algorithm comprises an N loudest speaker algorithm, wherein the plurality of video segments are determined as the N loudest video segments.

16. The apparatus of claim 14, wherein the floor control algorithm incorporates receiving input from a PTT button, wherein the PTT video segment and the one or more video segments are determined partially based on receiving input from a pressing of the PTT button.

17. The apparatus of claim 11, wherein the logic when executed is further operable to:
   receive multiple push to talk requests;
   determine a virtual loudness based on the multiple push to talk requests;
   map the virtual loudness to a real loudness for the plurality of video segments from the multiple locations;
   switch in the PTT video segment based on the virtual loudness and the real loudness.

18. The apparatus of claim 17, wherein the PTT video segment is switched in by replacing a removed video segment if the PTT video segment has a higher virtual loudness than the removed video segment.

19. The apparatus of claim 17, wherein the virtual loudness is determined based on detected gestures in the plurality of video segments.

20. An apparatus comprising:
   means for providing a conference with multiple locations;
   means for receiving a plurality of video segments from the multiple locations, wherein a particular location can send more than one video segment, and wherein the particular location includes a plurality of displays showing video from a portion of the multiple locations;
   means for receiving a push to talk (PTT) input from a PTT button;
   means for determining a PTT video segment associated with the push to talk input; and
   means for switching the PTT video segment in with one or more video segments; and
   means for displaying the PTT video segment with the one or more video segments on a selected one of the plurality of displays.

* * * * *